(12) United States Patent
Kasahara et al.

(10) Patent No.: US 12,169,143 B2
(45) Date of Patent: Dec. 17, 2024

(54) LIGHT DETECTION DEVICE

(71) Applicant: HAMAMATSU PHOTONICS K.K., Hamamatsu (JP)

(72) Inventors: Takashi Kasahara, Hamamatsu (JP); Katsumi Shibayama, Hamamatsu (JP); Kei Tabata, Hamamatsu (JP); Masaki Hirose, Hamamatsu (JP); Hiroki Oyama, Hamamatsu (JP); Yumi Kuramoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 18/223,209

(22) Filed: Jul. 18, 2023

(65) Prior Publication Data
US 2023/0358610 A1    Nov. 9, 2023

Related U.S. Application Data

(63) Continuation of application No. 17/634,280, filed as application No. PCT/JP2020/037874 on Oct. 6, 2020, now Pat. No. 11,796,391.

(30) Foreign Application Priority Data

Oct. 9, 2019   (JP) .................................. 2019-186080

(51) Int. Cl.
    *G01J 3/26*       (2006.01)
    *G01J 3/02*       (2006.01)
    (Continued)

(52) U.S. Cl.
    CPC ............... *G01J 3/26* (2013.01); *G01J 3/0297* (2013.01); *G01J 3/45* (2013.01); *G02B 5/281* (2013.01); *G02B 26/001* (2013.01)

(58) Field of Classification Search
CPC ... G01J 3/26; G01J 3/0297; G01J 3/45; G02B 5/281; G02B 26/001
See application file for complete search history.

(56) References Cited

U.S. PATENT DOCUMENTS 5,550,373 A   8/1996  Cole et al.
6,943,892 B2  9/2005  Chen
(Continued)

FOREIGN PATENT DOCUMENTS

CN          1080719 A      1/1994
CN        105683725 A      6/2016
(Continued)

OTHER PUBLICATIONS

International Preliminary Report on Patentability mailed Apr. 21, 2022 for PCT/JP2020/037874.
(Continued)

*Primary Examiner* — Tarifur R Chowdhury
*Assistant Examiner* — Kemaya Nguyen
(74) *Attorney, Agent, or Firm* — Faegre Drinker Biddle & Reath LLP

(57) ABSTRACT

A light detection device of the present invention includes: a wiring board; a first support part disposed on a mounting surface of the wiring board; a Fabry-Perot interference filter having a first mirror part and a second mirror part between which a distance is variable and having an outer edge portion disposed in a first support region of the first support part; a light detector disposed on the mounting surface to face the first mirror part and the second mirror part on one side of the first support part; and a temperature detector disposed on the mounting surface, wherein the temperature detector is disposed on the mounting surface such that at least a part of the temperature detector overlaps a part of the Fabry-Perot interference filter when seen in a first direction perpendicu- (Continued)

lar to the mounting surface and such that at least a part of the temperature detector overlaps a part of the first support part when seen in a second direction in which the first support part and the light detector are aligned with each other, and wherein a first distance between the temperature detector and the first support part in the second direction is smaller than a first width of the first support region in the second direction.

7 Claims, 8 Drawing Sheets

(51) Int. Cl.
    *G01J 3/45*     (2006.01)
    *G02B 5/28*     (2006.01)
    *G02B 26/00*     (2006.01)

(56) References Cited

U.S. PATENT DOCUMENTS

| | | | |
|---|---|---|---|
| 10,184,832 B2 * | 1/2019 | Shibayama | G01J 3/26 |
| 10,495,514 B2 * | 12/2019 | Varpula | G01J 3/45 |
| 10,545,049 B2 | 1/2020 | Antila | |
| 2016/0245696 A1 | 8/2016 | Shibayama et al. | |
| 2016/0245697 A1 | 8/2016 | Shibayama et al. | |
| 2016/0370573 A1 | 12/2016 | Shibayama et al. | |
| 2018/0348054 A1 | 12/2018 | Shibayama et al. | |

FOREIGN PATENT DOCUMENTS

| | | | | |
|---|---|---|---|---|
| CN | 105705920 A | 6/2016 | | |
| CN | 106687781 A | 5/2017 | | |
| JP | 2000-031510 A | 1/2000 | | |
| JP | 2010-190618 A | 9/2010 | | |
| JP | 2015-087318 A | 5/2015 | | |
| JP | 2018-010038 A | 1/2018 | | |
| JP | 6730300 B2 * | 7/2020 | ............... | G01B 9/02 |
| WO | WO 2015/002028 A1 | 1/2015 | | |
| WO | WO 2015/064749 A1 | 5/2015 | | |
| WO | WO 2015/064758 A1 | 5/2015 | | |
| WO | WO 2015/197920 A1 | 12/2015 | | |
| WO | WO 2019/102876 A1 | 5/2019 | | |

OTHER PUBLICATIONS

Malinen, J. et al., "Advances in miniature spectrometer and sensor development", SPIE Proceedings: Next-Generation Spectroscopic Technologies VII, vol. 9101, 2014, p91010C-1-p91010C-15.

* cited by examiner

LIGHT DETECTION DEVICE

TECHNICAL FIELD

The present disclosure relates to a light detection device.

BACKGROUND ART

A light detection device including a Fabry-Perot interference filter that has a first mirror part and a second mirror part between which a distance is variable, a light detector that detects light transmitted through the Fabry-Perot interference filter, and a temperature detector that detects a temperature of a space in which the Fabry-Perot interference filter disposed is known (see, for example, Patent Literature 1). In such a light detection device, the distance between the first mirror part and the second mirror part is controlled according to a potential difference between the first mirror part and the second mirror part, and a wavelength of light transmitted through the first mirror part and the second mirror part is controlled according to the distance between the first mirror part and the second mirror part.

CITATION LIST

Patent Literature

[Patent Literature 1] Japanese Unexamined Patent Publication No. 2015-87318

SUMMARY OF INVENTION

Technical Problem

In a light detection device like that described above, even if a potential difference between the first mirror part and the second mirror part is constant, when a temperature of the Fabry-Perot interference filter changes, a distance between the first mirror part and the second mirror part changes. As a result, a wavelength of light transmitted through the first mirror part and the second mirror part may deviate from a target wavelength (hereinafter, such properties of the Fabry-Perot interference filter are referred to as "temperature characteristics of the Fabry-Perot interference filter"). Therefore, in a light detection device like that described above, in order to correct temperature characteristics of the Fabry-Perot interference filter, a temperature of a space in which the Fabry-Perot interference filter is disposed is detected by a temperature detector.

An object of the present disclosure is to provide a light detection device capable of highly accurate correction of temperature characteristics of a Fabry-Perot interference filter.

Solution to Problem

A light detection device according to an aspect of the present disclosure includes: a wiring board; a first support part disposed on a mounting surface of the wiring board; a Fabry-Perot interference filter having a first mirror part and a second mirror part between which a distance is variable and having an outer edge portion disposed in a first support region of the first support part; a light detector disposed on the mounting surface to face the first mirror part and the second mirror part on one side of the first support part; and a temperature detector disposed on the mounting surface, wherein the temperature detector is disposed on the mounting surface such that at least a part of the temperature detector overlaps a part of the Fabry-Perot interference filter when seen in a first direction perpendicular to the mounting surface and such that at least a part of the temperature detector overlaps a part of the first support part when seen in a second direction in which the first support part and the light detector are aligned with each other, and wherein a first distance between the temperature detector and the first support part in the second direction is smaller than a first width of the first support region in the second direction.

In the light detection device, the first distance between the temperature detector and the first support part in the second direction is smaller than the first width of the first support region in the second direction. As a result, it is possible to bring the temperature detector closer to the first support part while sufficiently securing an area of the first support region which is a thermal connection region between the Fabry-Perot interference filter and the first support part. Therefore, it is possible to obtain a temperature in which the temperature of the Fabry-Perot interference filter is accurately reflected. Therefore, according to this light detection device, it is possible to correct the temperature characteristics of the Fabry-Perot interference filter with high accuracy.

The light detection device according to an aspect of the present disclosure may further include a second support part disposed on the mounting surface to face the first support part with the light detector interposed therebetween in the second direction, wherein the outer edge portion of the Fabry-Perot interference filter may be disposed in a second support region of the second support part, wherein the temperature detector may be disposed on the mounting surface such that at least a part of the temperature detector overlaps a part of the second support part when seen in the second direction, and wherein a second distance between the temperature detector and the second support part in the second direction may be smaller than a second width of the second support region in the second direction. According to this, it is possible to bring the temperature detector closer to the second support part while sufficiently securing an area of the second support region which is a thermal connection region between the Fabry-Perot interference filter and the second support part. Therefore, it is possible to obtain a temperature in which the temperature of the Fabry-Perot interference filter is more accurately reflected.

In the light detection device according to an aspect of the present disclosure, the outer edge portion of the Fabry-Perot interference filter may be disposed in the first support region and the second support region such that the first width and the second width are equal to each other, and the temperature detector may be disposed on the mounting surface such that the first distance and the second distance are equal to each other. According to this, it is possible to obtain a temperature in which the temperature of the Fabry-Perot interference filter is evenly reflected via each of the first support part and the second support part.

In the light detection device according an aspect of the present disclosure, in a space which is located between the wiring board and the Fabry-Perot interference filter in the first direction and is located between the first support part and the second support part in the second direction, a value obtained by dividing a width of the space in a third direction perpendicular to both the first direction and the second direction by a width of the space in the second direction may be 1.5 or more. According to this, while the temperature detector is brought closer to each of the first support part and the second support part in the second direction, the length of the first support region in the third direction and the length of the second support region in the third direction can be secured, and thus the area of the first support region and the area of the second support region can be sufficiently secured.

In the light detection device according an aspect of the present disclosure, the wiring board may have a long shape having a third direction perpendicular to both the first direction and the second direction as a longitudinal direction, and each of the first support part and the second support part may be disposed on the mounting surface to extend along each of both edge portions of the wiring board in the second direction. According to this, it is possible to easily form the space in which the width in the third direction is larger than the width in the second direction.

The light detection device according an aspect of the present disclosure may further include: a placement part on which the wiring board is disposed; a first terminal and a second terminal provided in the placement part; a first wire electrically connecting one electrode of the light detector and the first terminal; and a second wire and a third wire electrically connecting the other electrode of the light detector and the second terminal, wherein the wiring board may have a wiring having a first electrode pad electrically connected to the one electrode of the light detector on the mounting surface and provided on the mounting surface, and a second electrode pad provided on the mounting surface, wherein the first wire may electrically connect the first electrode pad and the first terminal, wherein the second wire may electrically connect the other electrode of the light detector and the second electrode pad, wherein the third wire may electrically connect the second electrode pad and the second terminal, and wherein the first electrode pad and the second electrode pad may be located outside the Fabry-Perot interference filter when seen in the first direction. According to this, it is possible to prevent the second wire and the third wire from coming into contact with peripheral members (the Fabry-Perot interference filter, the first support part, the second support part, and the like).

The light detection device according an aspect of the present disclosure may further include: a placement part on which the wiring board is disposed; a first terminal and a second terminal provided in the placement part; a first wire electrically connecting one electrode of the light detector and the first terminal; and a second wire electrically connecting the other electrode of the light detector and the second terminal, wherein the wiring board may have a wiring having a first electrode pad electrically connected to the one electrode of the light detector on the mounting surface and provided on the mounting surface, wherein the first wire may electrically connect the first electrode pad and the first terminal, wherein the second wire may electrically connect the other electrode of the light detector and the second terminal, and wherein the first electrode pad may be located outside the Fabry-Perot interference filter when seen in the first direction. According to this, it is possible to suppress the generation of a noise in the detection signal output from the light detector due to a voltage signal applied to the Fabry-Perot interference filter.

Advantageous Effects of Invention

According to the present disclosure, it is possible to provide a light detection device capable of highly accurate correction of temperature characteristics of a Fabry-Perot interference filter.

DESCRIPTION OF EMBODIMENTS

Figure 1:
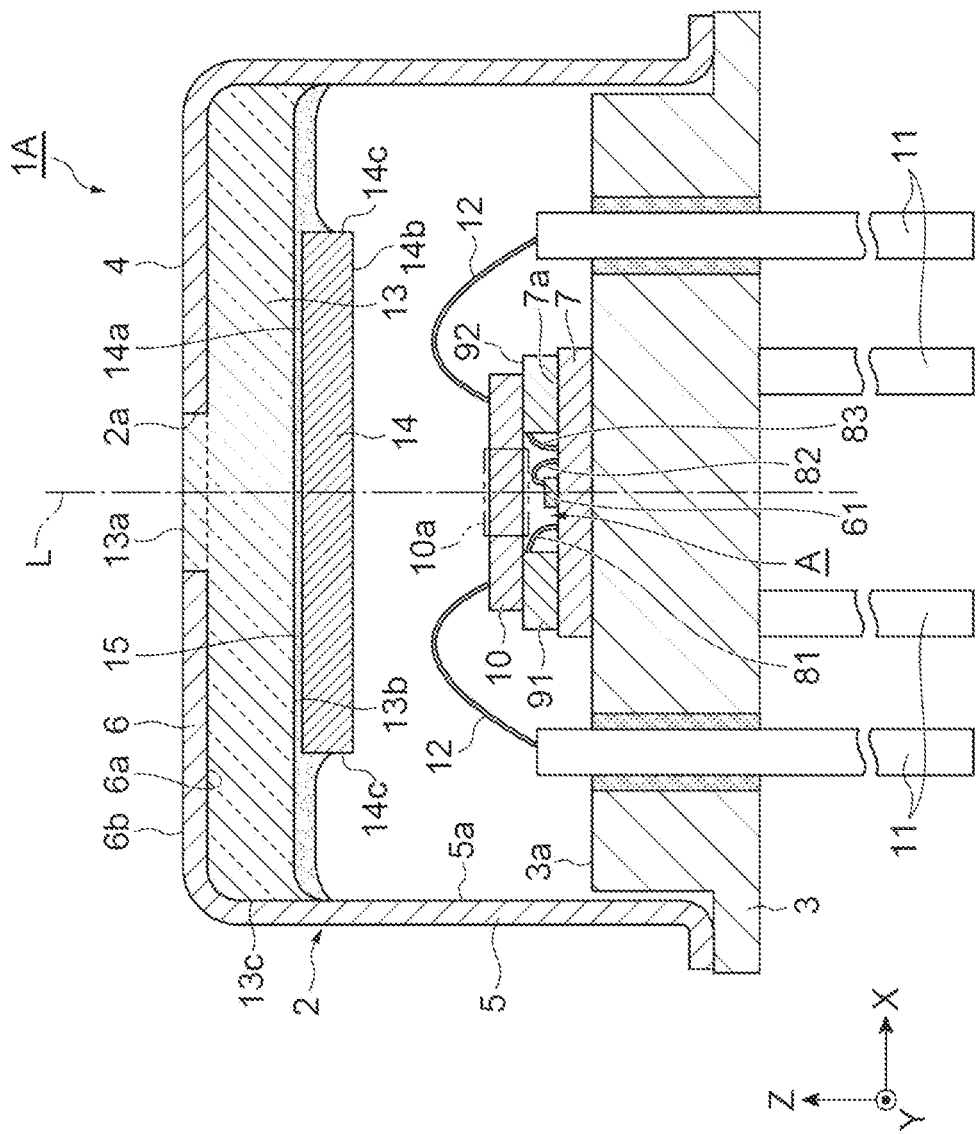
FIG. 1 is a cross-sectional view of a light detection device according to a first embodiment.

Hereinafter, an embodiment of the present disclosure will be described in detail with reference to the drawings. In the drawings, the same or corresponding portions will be denoted by the same reference signs and redundant description will be omitted.

First Embodiment

[Light Detection Device]

Figure 2:
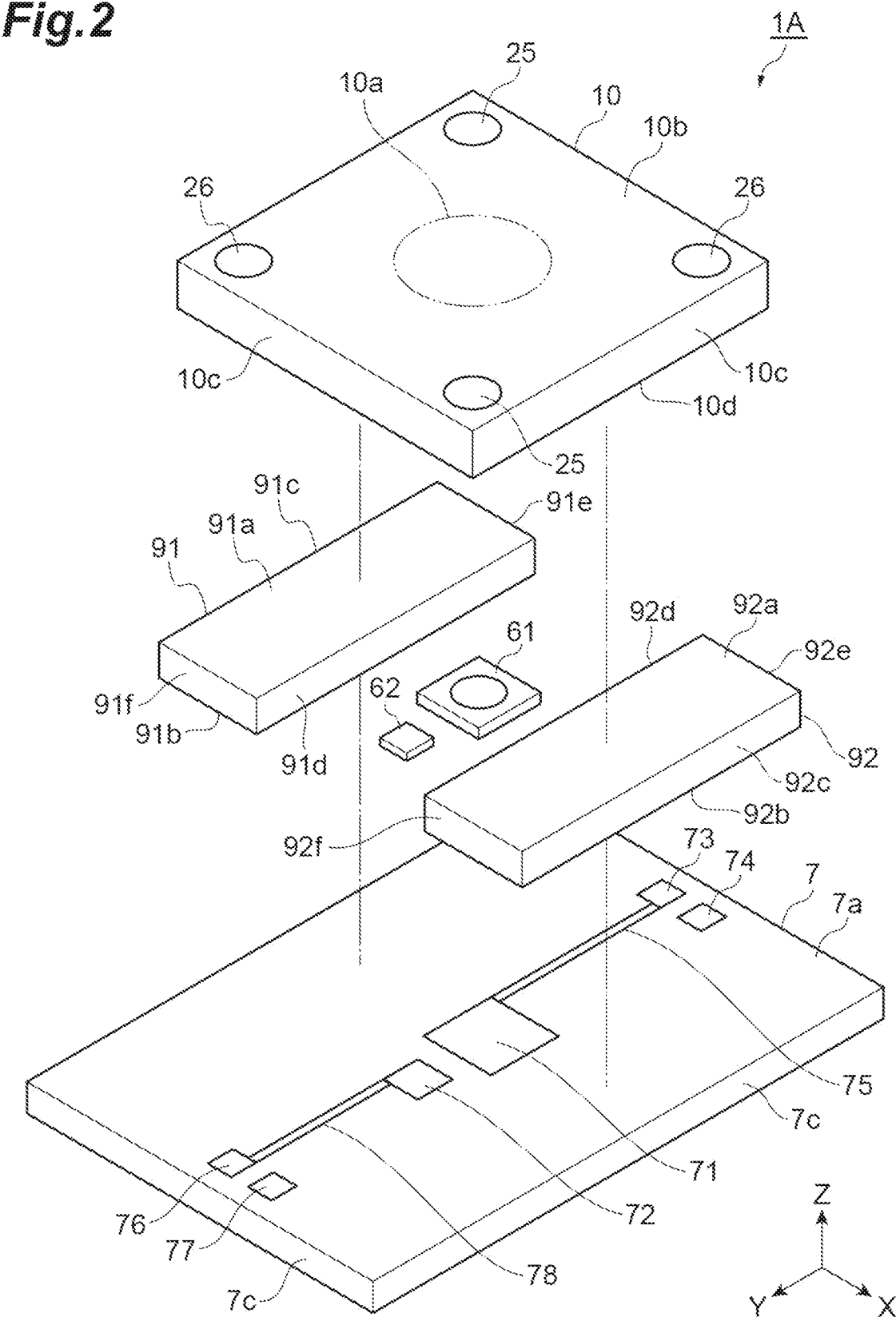
FIG. 2 is an exploded perspective view of a part of the light detection device shown in FIG. 1.

As shown in FIGS. 1 and 2, a light detection device 1A of a first embodiment includes a housing 2, a wiring board 7, a first support part 91, a second support part 92, a Fabry-Perot interference filter 10, a light detector 61, and a temperature detector 62. The housing 2 accommodates the wiring board 7, the first support part 91, the second support part 92, the Fabry-Perot interference filter 10, the light detector 61, and the temperature detector 62. In the present embodiment, the housing 2 is a CAN package having a stem (a placement part) 3 and a cap 4. The cap 4 has a side wall 5 and a top wall 6 which are integrally formed with each other. A material of each of the stem 3 and the cap 4 is, for example, a metal. The cap 4 has a cylindrical shape with a line L as a center line. The wiring board 7 is disposed on an inner surface 3a of the stem 3. The wiring board 7 is fixed to the inner surface 3a of the stem 3 with, for example, an adhesive member. A substrate material of the wiring board 7 is, for example, silicon, ceramic, quartz, glass, plastic, or the like.

The first support part 91 and the second support part 92 are disposed on a mounting surface 7a of the wiring board 7. The first support part 91 and the second support part 92 are fixed to the mounting surface 7a of the wiring board 7 with, for example, an adhesive member. In the present embodiment, the first support part 91 and the second support part 92 are formed separately from the wiring board 7. When seen in a Z-axis direction (a first direction) perpendicular to the mounting surface 7a of the wiring board 7, the first support part 91 and the second support part 92 face each other in an X-axis direction (a second direction). The Z-axis direction is a direction parallel to the line L. A material of each of the first support part 91 and the second support part 92 is, for example, silicon, ceramic, quartz, glass, plastic, glass epoxy, or the like.

The Fabry-Perot interference filter 10 is disposed on the first support part 91 and the second support part 92. The Fabry-Perot interference filter 10 is fixed to the first support part 91 and the second support part 92 with, for example, an adhesive member. A center line of a light transmission region 10a of the Fabry-Perot interference filter coincides with the line L. In the present embodiment, the light transmission region 10a of the Fabry-Perot interference filter 10 has a circular shape when seen in the Z-axis direction.

The light detector 61 is mounted on the mounting surface 7a of the wiring board 7. That is, the light detector 61 is disposed on the mounting surface 7a of the wiring board 7. A center line of a light receiving portion of the light detector 61 coincides with the line L. The light detector 61 detects light transmitted through the Fabry-Perot interference filter 10. In the present embodiment, the light detector 61 is an infrared detector and is constituted by, for example, a light receiving element such as an InGaAs photodiode, a thermopile, or a bolometer. The light detector 61 may be constituted by, for example, a light receiving element such as a Si photodiode in a case in which ultraviolet light, visible light, and near-infrared light are detected. Further, the light detector 61 may be constituted by one light receiving element or may be constituted by a plurality of light receiving elements. The light detector 61 may be provided with one light receiving portion, or the light detector 61 may be a photodiode array in which a plurality of light receiving portions are provided in an array shape, a CCD image sensor, a CMOS image sensor, or the like.

The temperature detector 62 is mounted on the mounting surface 7a of the wiring board 7. That is, the temperature detector 62 is disposed on the mounting surface 7a of the wiring board 7. A detection signal detected by the temperature detector 62 is used to correct temperature characteristics of the Fabry-Perot interference filter 10. In the present embodiment, the temperature detector 62 is, for example, a thermistor, a resistance temperature detector, a thermocouple, a linear resistor, a semiconductor temperature sensor, or the like.

An opening 2a is formed in the housing 2. The opening 2a is formed in the top wall 6 of the cap 4 such that its center line coincides with the line L. The opening 2a faces the light transmission region 10a of the Fabry-Perot interference filter 10 in the Z-axis direction. In the present embodiment, the opening 2a has a circular shape when seen in the Z-axis direction. A light transmission member 13 is joined to an inner surface 6a of the top wall 6 to close the opening 2a. A material of the light transmission member 13 is, for example, glass or the like. The light transmission member 13 has a light incidence surface 13a and a light emitting surface 13b which face each other in the Z-axis direction and a side surface 13c. The light incidence surface 13a is substantially flush with an outer surface 6b of the top wall 6 of the cap 4 at the opening 2a. The side surface 13c is in contact with an inner surface 5a of the side wall 5 of the cap 4. Such a light transmission member 13 is formed by melting glass pellets disposed inside the cap 4 with the opening 2a located on a lower side.

A bandpass filter 14 is fixed to the light emitting surface 13b of the light transmission member 13 with an adhesive member 15 formed of a light transmission material. The bandpass filter 14 selectively transmits light in a measurement wavelength range of the light detection device 1A (light in a predetermined wavelength range to be input to the light transmission region 10a of the Fabry-Perot interference filter 10) out of light transmitted through the light transmission member 13. In the present embodiment, the bandpass filter 14 has, for example, a quadrangular plate shape. The bandpass filter 14 has a light incidence surface 14a and a light emitting surface 14b which face each other in the Z-axis direction and four side surfaces 14c. The bandpass filter 14 is constituted by a light transmission member formed of, for example, silicon, glass, or the like and a dielectric multilayer film formed on a surface of the light transmission member. The dielectric multilayer film is constituted by a film formed of a high refraction material (for example, $TiO_2$, $Ta_2O_5$, or the like) and a film formed of a low refraction material (for example, $SiO_2$, $MgF_2$, or the like).

[Fabry-Perot Interference Filter]

Figure 3:
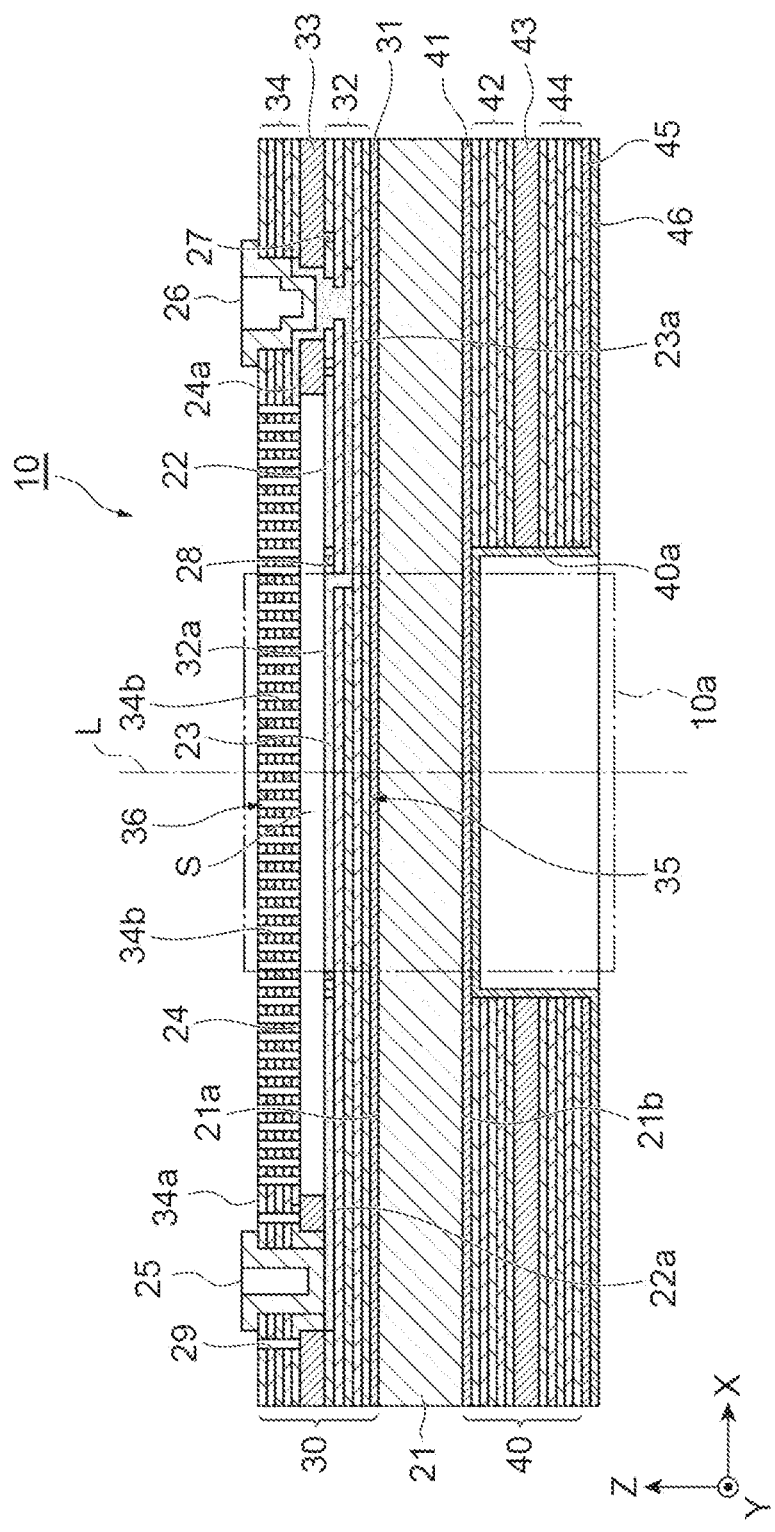
FIG. 3 is a cross-sectional view of a Fabry-Perot interference filter shown in FIG. 1.

As shown in FIGS. 2 and 3, the Fabry-Perot interference filter is provided with the light transmission region 10a through which light having a wavelength corresponding to a distance between a first mirror part 35 and a second mirror part 36 is transmitted. The light transmission region 10a is, for example, a columnar region having the line L as a center line.

The Fabry-Perot interference filter 10 includes a substrate 21. The substrate 21 has, for example, a rectangular plate shape. A material of the substrate 21 is, for example, silicon, quartz, glass, or the like. The substrate 21 has a first surface 21a and a second surface 21b which face each other in a direction parallel to the line L. The first surface 21a is a surface on a light incidence side (a side of the bandpass filter 14). The second surface 21b is a surface on a light emitting side (a side of the light detector 61).

A first layer structure body 30 is disposed on the first surface 21a of the substrate 21. The first layer structure body 30 is formed by stacking a first antireflection layer 31, a first stacked body 32, a first intermediate layer 33, and a second stacked body 34 on the first surface 21a in that order. A gap (an air gap) S is formed between the first stacked body 32 and the second stacked body 34 with the first intermediate layer 33 having a frame shape. In a case in which the material of the substrate 21 is silicon, a material of each of the first antireflection layer 31 and the first intermediate layer 33 is, for example, silicon oxide. A thickness of the first intermediate layer 33 is, for example, several tens of nm to several tens of μm.

A portion of the first stacked body 32 corresponding to the light transmission region 10a functions as the first mirror part 35. The first stacked body 32 is constituted by a dielectric multilayer film. As an example, the first stacked body 32 is formed by alternately stacking a plurality of polysilicon layers and a plurality of silicon nitride layers one by one. An optical thickness of each of the polysilicon layer and the silicon nitride layer constituting the first mirror part 35 is preferably an integral multiple of ¼ of a central transmission wavelength of the light transmitted through the light transmission region 10a. The first mirror part 35 may be disposed on the first surface 21a of the substrate 21 without the first antireflection layer 31.

A portion of the second stacked body 34 corresponding to the light transmission region 10a functions as the second mirror part 36. The second mirror part 36 faces the first mirror part 35 via the gap S in a direction parallel to the line L. The second stacked body 34 is constituted by a dielectric multilayer film. As an example, the second stacked body 34 is formed by alternately stacking a plurality of polysilicon layers and a plurality of silicon nitride layers one by one. An optical thickness of each of the polysilicon layer and the silicon nitride layer constituting the second mirror part 36 is preferably an integral multiple of ¼ of a central transmission wavelength of the light transmitted through the light transmission region 10a.

In the first stacked body 32 and the second stacked body 34, a silicon oxide layer may be disposed instead of the silicon nitride layer. Further, the material of each layer constituting the first stacked body 32 and the second stacked body 34 is not limited to the above-mentioned materials and may be, for example, titanium oxide, tantalum oxide, zirconium oxide, magnesium fluoride, aluminum oxide, calcium fluoride, silicon, germanium, zinc sulfide, or the like.

A plurality of through holes 34b are formed in a portion of the second stacked body 34 corresponding to the gap S. Each through hole 34b reaches the gap S from a surface 34a of the second stacked body 34 on a side opposite to the first stacked body 32. The plurality of through holes 34b are formed to such an extent that they do not substantially affect the function of the second mirror part 36. The plurality of through holes 34b are used to form the gap S by removing a part of the first intermediate layer 33 by etching.

A first electrode 22 is formed on the first stacked body 32 to surround the light transmission region 10a. A second electrode 23 is formed on the first stacked body 32 to include the light transmission region 10a. The first electrode 22 and the second electrode 23 are formed by doping the polysilicon layer closest to the gap S in the first stacked body 32 with impurities to reduce a resistance. In the second stacked body 34, a third electrode 24 is formed to face the first electrode 22 and the second electrode 23 via the gap S. The third electrode 24 is formed by doping the polysilicon layer closest to the gap S in the second stacked body 34 with impurities to reduce a resistance. It is sufficient for the second electrode 23 to have a size substantially the same as that of the light transmission region 10a or larger than that of the light transmission region 10a.

The first layer structure body 30 is provided with a pair of terminals 25 and a pair of terminals 26. The pair of terminals 25 face each other with the light transmission region 10a interposed therebetween. Each terminal 25 is disposed in a through hole from the surface 34a of the second stacked body 34 to the first stacked body 32. Each terminal 25 is electrically connected to the first electrode 22 via a wiring 22a formed in the first stacked body 32. The pair of terminals 26 face each other with the light transmission region 10a interposed therebetween in a direction perpendicular to the direction in which the pair of terminals 25 face each other. Each terminal 26 is disposed in a through hole from the surface 34a of the second stacked body 34 to the inside of the first intermediate layer 33. Each terminal 26 is electrically connected to the second electrode 23 via a wiring 23a formed in the first stacked body 32 and is electrically connected to the third electrode 24 via a wiring 24a formed in the second stacked body 34.

Trenches 27 and 28 are provided in a surface 32a of the first stacked body 32 on a side of the second stacked body 34. The trench 27 extends in an annular shape to surround a connecting portion of the wiring 23a with the terminal 26. The trench 27 electrically insulates the first electrode 22 and the wiring 23a from each other. The trench 28 extends in an annular shape along an inner edge of the first electrode 22. The trench 28 electrically insulates the first electrode 22 and a region inside the first electrode 22 (that is, a region where the second electrode 23 is present) from each other. A trench 29 is provided in the surface 34a of the second stacked body 34. The trench 29 extends in an annular shape to surround the terminal 25. The trench 29 electrically insulates the terminal 25 and the third electrode 24 from each other. A region in each of the trenches 27, 28, and 29 may be an insulating material or may be a gap.

A second layer structure body 40 is disposed on the second surface 21a of the substrate 21. The second layer structure body 40 is formed by stacking a second antireflection layer 41, a third stacked body 42, a second intermediate layer 43, and a fourth stacked body 44 on the second surface 21b in that order. The second antireflection layer 41, the third stacked body 42, the second intermediate layer 43, and the fourth stacked body 44 have the same configurations as the first antireflection layer 31, the first stacked body 32, the first intermediate layer 33, and the second stacked body 34, respectively. That is, the second layer structure body 40 has a stacked structure symmetrical to the first layer structure body 30 with the substrate 21 as a reference. The second layer structure body 40 is configured to correspond to the first layer structure body 30, thereby preventing the Fabry-Perot interference filter 10 from warping.

An opening 40a is formed in the third stacked body 42, the second intermediate layer 43, and the fourth stacked body 44 to include the light transmission region 10a. The opening 40a has, for example, a columnar shape having the line L as a center line and has a diameter substantially the same as that of the light transmission region 10a. The opening 40a is open to the light emitting side, and a bottom surface of the opening 40a reaches the second antireflection layer 41. The opening 40a allows light transmitted through the first mirror part 35 and the second mirror part 36 to pass through.

A light shielding layer 45 is formed on a surface of the fourth stacked body 44 on the light emitting side. A material of the light shielding layer 45 is, for example, aluminum or the like. A protective layer 46 is formed on a surface of the light shielding layer 45 and an inner surface of the opening 40a. A material of the protective layer 46 is, for example, aluminum oxide. When a thickness of the protective layer 46 is set to 1 to 100 nm (preferably about 30 nm), optical influence of the protective layer 46 can be ignored.

In the Fabry-Perot interference filter 10 configured as described above, when a voltage is applied between the terminal 25 and the terminal 26, a potential difference occurs between the first electrode 22 and the third electrode 24, and an electrostatic force corresponding to the potential difference is generated between the first electrode 22 and the third electrode 24. As a result, the second mirror part 36 is attracted to a side of the first mirror part 35 fixed to the substrate 21, and the distance between the first mirror part 35 and the second mirror part 36 changes. At this time, since no potential difference is generated between the second electrode 23 and the third electrode 24, flatness of the second mirror part 36 in the light transmission region 10a is ensured. As described above, in the Fabry-Perot interference filter 10, the distance between the first mirror part 35 and the second mirror part 36 is variable. Here, the wavelength of the light transmitted through the light transmission region 10a depends on the distance between the first mirror part 35 and the second mirror part 36. Therefore, when the voltage applied between the terminal 25 and the terminal 26 is adjusted, the wavelength of the light transmitted through the light transmission region 10a can be adjusted.

[Internal Structure of Light Detection Device]

Figure 4:
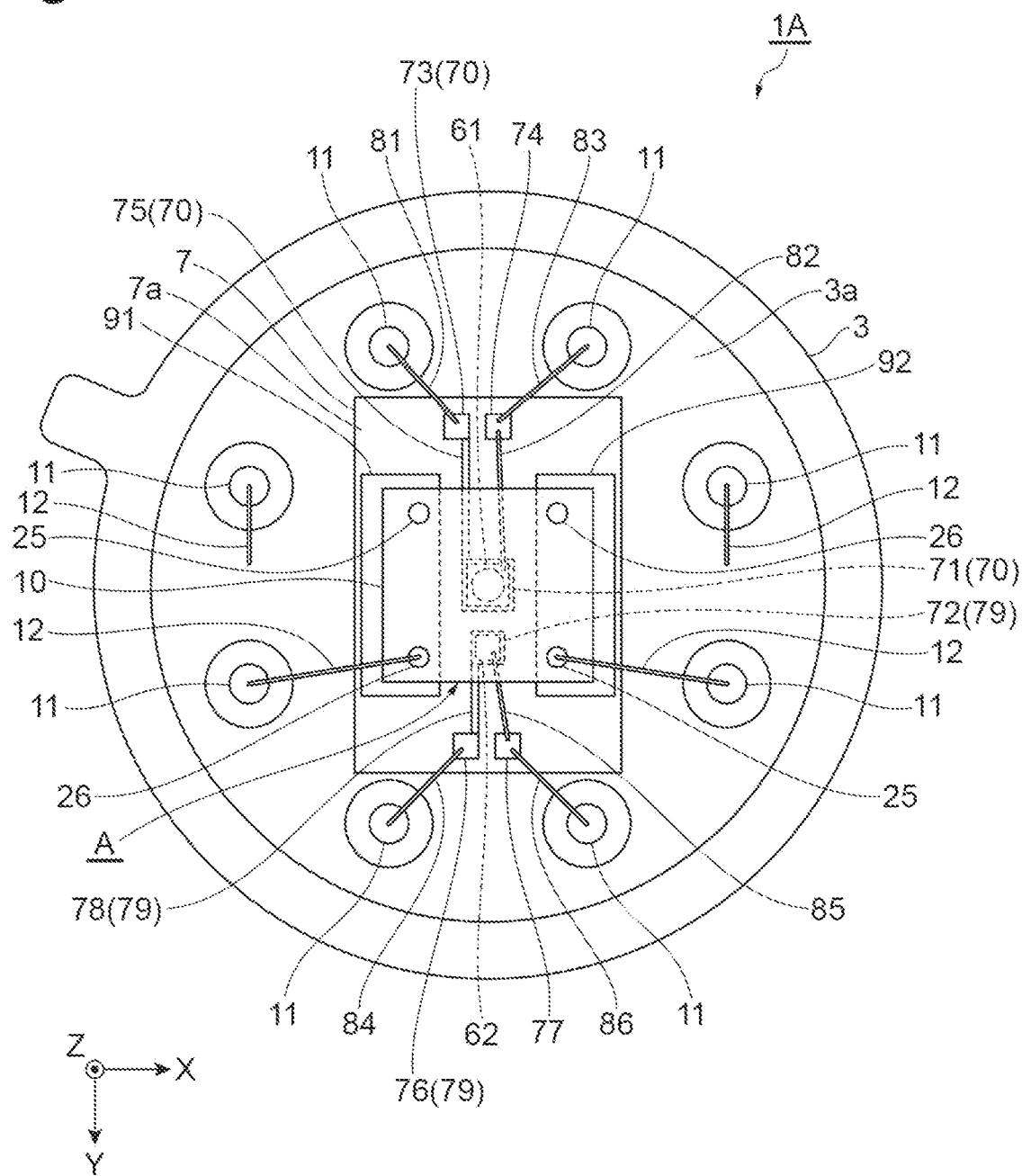
FIG. 4 is a plan view of an internal structure of the light detection device shown in FIG. 1.

As shown in FIGS. 2 and 4, the wiring board 7 has a long shape having a Y-axis direction (a third direction perpendicular to both the first direction and the second direction) as a longitudinal direction. As an example, the wiring board 7 has a rectangular plate shape in which the Z-axis direction is a thickness direction, the X-axis direction is a short side direction, and the Y-axis direction is a long side direction.

Each of the first support part 91 and the second support part 92 is disposed on the mounting surface 7a to extend along each of both edge portions of the wiring board 7 in the X-axis direction. The first support part 91 is disposed in a portion on the other side (a left side in the drawing) of the mounting surface 7a in the X-axis direction. The second support part 92 is disposed in a portion on one side (a right side in the drawing) of the mounting surface 7a in the X-axis direction. As an example, each of the first support part 91 and the second support part 92 has a rectangular parallelepiped shape with the Y-axis direction as a longitudinal direction. The light detector 61 and the temperature detector 62 are interposed between the first support part 91 and the second support part 92 in the X-axis direction. The first support part 91 and the second support part 92 are disposed on the mounting surface 7a such that a bottom surface 91b and a bottom surface 92b thereof completely overlap the wiring board 7. The Fabry-Perot interference filter 10 is disposed on an upper surface 91a of the first support part 91 and an upper surface 92a of the second support part 92 and is supported by the first support part 91 and the second support part 92.

Figure 5:
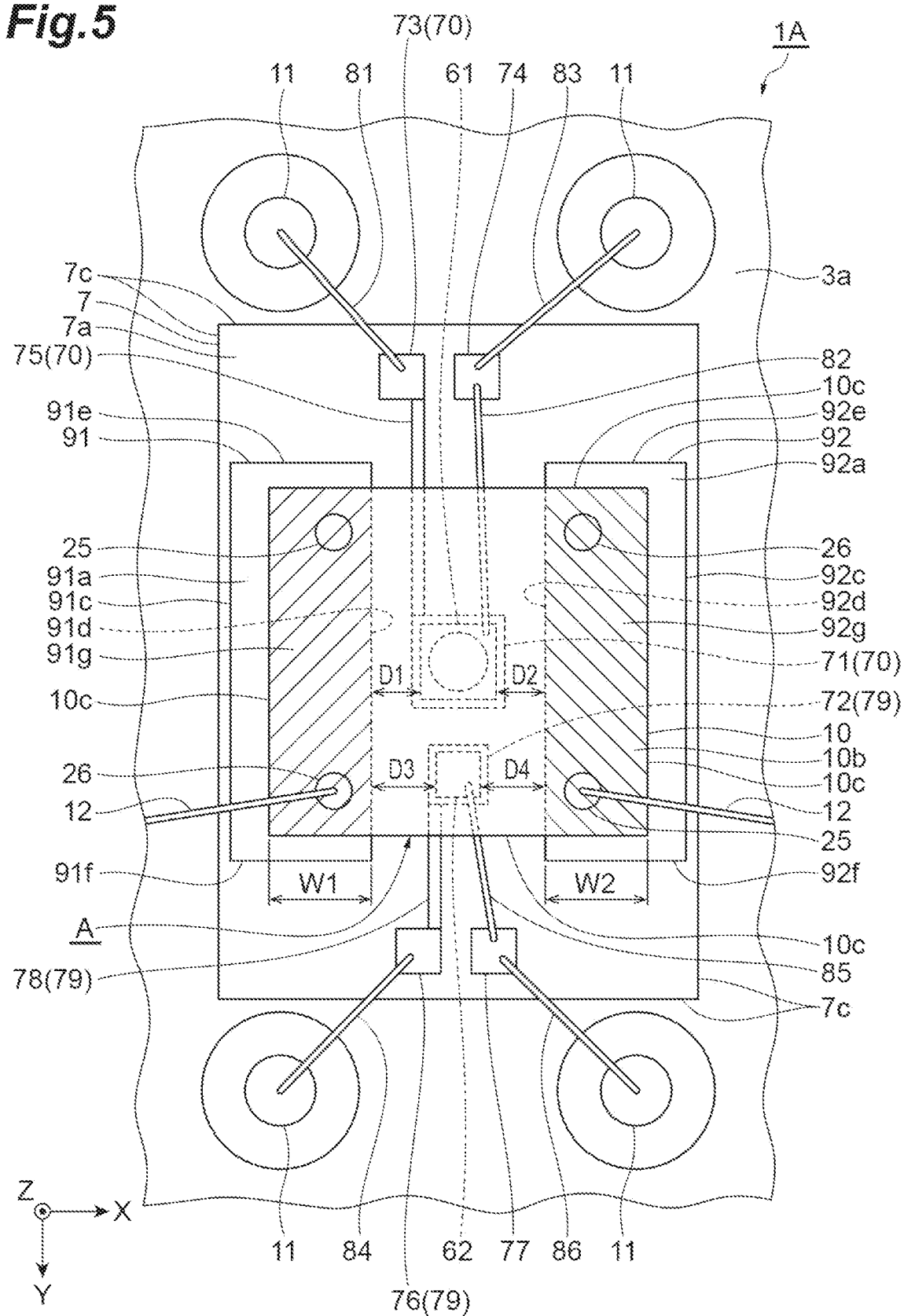
FIG. 5 is a plan view of a part of the internal structure of the light detection device shown in FIG. 1.

As shown in FIG. 5, each side surface of the first support part 91 and the second support part 92 is located inside each side surface 7c of the wiring board 7 when seen in the Z-axis direction. Specifically, an outer side surface 91c of the first support part 91 on a side opposite to the second support part 92 is located inside the side surface 7c of the wiring board 7 when seen in the Z-axis direction. Side surfaces 91e and 91f of the first support part 91 on both sides in the Y-axis direction are each located inside the side surface 7c of the wiring board 7 when seen in the Z-axis direction. An outer side surface 92c of the second support part 92 on a side opposite to the first support part 91 is located inside the side surface 7c of the wiring board 7 when seen in the Z-axis direction. Side surfaces 92e and 92f of the second support part 92 on both sides in the Y-axis direction are each located inside the side surface 7c of the wiring board 7 when seen in the Z-axis direction. An inner side surface 91d of the first support part 91 on a side closer to the second support part 92 and an inner side surface 92d of the second support part 92 on a side closer to the first support part 91 face each other in the X-axis direction. The outer side surface 91c of the first support part 91 may overlap the side surface 7c of the wiring board 7 when seen in the Z-axis direction. The outer side surface 92c of the second support part 92 may overlap the side surface 7c of the wiring board 7 when seen in the Z-axis direction.

Each side surface 10c of the Fabry-Perot interference filter 10 is located inside each side surface of the first support part 91 and the second support part 92 when seen in the Z-axis direction. Specifically, the side surfaces 10c of the Fabry-Perot interference filter 10 on both sides in the X-axis direction are each located inside the outer side surface 91c of the first support part 91 and the outer side surface 92c of the second support part 92. The side surface 10c of the Fabry-Perot interference filter 10 on one side in the Y-axis direction is located inside each of the side surface 91e of the first support part 91 on one side in the Y-axis direction and the side surface 92e of the second support part 92 on one side in the Y-axis direction. The side surface 10c of the Fabry-Perot interference filter 10 on the other side in the Y-axis direction is located inside each of the side surface 91f of the first support part 91 on the other side in the Y-axis direction and the side surface 92f of the second support part 92 on the other side in the Y-axis direction. Each side surface 10c of the Fabry-Perot interference filter may overlap the outer side surface 91c of the first support part 91, the side surfaces 91e and 91f of the first support part 91, the outer side surface 92c of the second support part 92, and the side surfaces 92e and 92f of the second support part 92 when seen in the Z-axis direction.

In the present embodiment, an outer edge portion 10b of the Fabry-Perot interference filter 10 outside the light transmission region 10a (a region that does not include the light transmission region 10a and surrounds the light transmission region 10a) is disposed in a first support region 91g of the first support part 91 and a second support region 92g of the second support part 92.

The first support region 91g is a region in which the upper surface 91a of the first support part 91 overlaps the Fabry-Perot interference filter 10 when seen in the Z-axis direction. In the present embodiment, the first support region 91g has a long shape with the Y-axis direction as a longitudinal direction. Specifically, the first support region 91g is a region defined by the inner side surface 91d of the first support part 91, the side surfaces 10c of the Fabry-Perot interference filter 10 on both sides in the Y-axis direction, and the side surface 10c of the Fabry-Perot interference filter 10 on a side of the first support part 91 in the X-axis direction when seen in the Z-axis direction. As an example, the first support region 91g has a rectangular shape in which the X-axis direction is a short side direction and the Y-axis direction is a long side direction.

The second support region 92g is a region in which the upper surface 92a of the second support part 92 overlaps the Fabry-Perot interference filter 10 when seen in the Z-axis direction. In the present embodiment, the second support region 92g has a long shape with the Y-axis direction as a longitudinal direction. Specifically, the second support region 92g is a region defined by the inner side surface 92d of the second support part 92, the side surfaces 10c of the Fabry-Perot interference filter 10 on both sides in the Y-axis direction, and the side surface 10c of the Fabry-Perot interference filter 10 on a side of the second support part 92 in the X-axis direction when seen in the Z-axis direction. As an example, the second support region 92g has a rectangular shape in which the X-axis direction is a short side direction and the Y-axis direction is a long side direction.

A first width W1 of the first support region 91g in the X-axis direction and a second width W2 of the second support region 92g in the X-axis direction are equal to each other. That is, the outer edge portion 10b of the Fabry-Perot interference filter 10 is disposed in the first support region 91g and the second support region 92g such that the first width W1 and the second width W2 are equal to each other. The first width of the first support region 91g in the X-axis direction is the maximum value of a length of the first support region 91g in the X-axis direction. The second width of the second support region 92g in the X-axis direction is the maximum value of a length of the second support region 92g in the X-axis direction.

The wiring board 7, the first support part 91, the second support part 92, and the Fabry-Perot interference filter 10 define a space A. The space A is a space located between the wiring board 7 and the Fabry-Perot interference filter 10 in the Z-axis direction and between the first support part 91 and the second support part 92 in the X-axis direction. Specifically, the space A is a space located between the mounting surface 7a of the wiring board 7 and a bottom surface 10d of the Fabry-Perot interference filter 10 and between the inner side surface 91d of the first support part 91 and the inner side surface 92d of the second support part 92. That is, the space A is a space defined by the inner side surface 91d of the first support part 91, the inner side surface 92d of the second support part 92, and the side surfaces 10c of the Fabry-Perot interference filter 10 on both sides in the Y-axis direction when seen in the Z-axis direction.

The space A has a long shape with the Y-axis direction as a longitudinal direction. The space A has a rectangular parallelepiped shape in which a width in the Y-axis direction is larger than a width in the X-axis direction, for example.

Regarding the space A, a value obtained by dividing the width of the space A in the Y-axis direction (a long side) by the width of the space A in the X-axis direction (a short side) (hereinafter referred to as an "aspect ratio of the space A") is 1.5 or more. A width of the space A in the Z-axis direction is smaller than the width of the space A in the Y-axis direction and the width of the space A in the X-axis direction. The width of the space A in the Y-axis direction is the maximum value of a length of the space A in the Y-axis direction. The width of the space A in the X-axis direction is the minimum value of a length of the space A in the X-axis direction. The width of the space A in the Z-axis direction is the minimum value of a length of the space A in the Z-axis direction.

The wiring board 7 includes wirings 70 and 79 and electrode pads 74 and 77. The wirings 70 and 79 and the electrode pads 74 and 77 are provided on the mounting surface 7a of the wiring board 7. The wiring 70 has a mounting portion 71, an electrode pad 73, and a connecting portion 75. The mounting portion 71 overlaps the Fabry-Perot interference filter 10 when seen in the Z-axis direction. The mounting portion 71 is disposed inside the space A. The mounting portion 71 faces the first mirror part 35 and the second mirror part 36 of the Fabry-Perot interference filter 10 in the Z-axis direction. The electrode pad (a first electrode pad) 73 is provided on one side of the mounting portion 71 in the Y-axis direction when seen in the Z-axis direction. The connecting portion 75 is disposed between the mounting portion 71 and the electrode pad 73 and extends in the Y-axis direction. The mounting portion 71 and the electrode pad 73 are electrically connected through the connecting portion 75. The electrode pad (a second electrode pad) 74 is provided on one side of the mounting portion 71 in the Y-axis direction when seen in the Z-axis direction. The electrode pad 73 and the electrode pad 74 are aligned with each other in the X-axis direction.

The electrode pad 73 and the electrode pad 74 are disposed outside the Fabry-Perot interference filter 10 when seen in the Z-axis direction. The electrode pad 73 and the electrode pad 74 are disposed outside the space A. The electrode pad 73 and the electrode pad 74 are disposed on a side opposite to the Fabry-Perot interference filter 10 with respect to the side surface 91e of the first support part 91 and the side surface 92e of the second support part 92 when seen in the Z-axis direction.

The wiring 79 has a mounting portion 72, an electrode pad 76, and a connecting portion 78. The mounting portion 72 overlaps the Fabry-Perot interference filter 10 when seen in the Z-axis direction. The mounting portion 72 is disposed inside the space A. The mounting portion 72 is disposed on the other side of the mounting portion 71 in the Y-axis direction. The electrode pad 76 is provided on the other side of the mounting portion 72 in the Y-axis direction when seen in the Z-axis direction. The connecting portion 78 is disposed between the mounting portion 72 and the electrode pad 76 and extends in the Y-axis direction. The mounting portion 72 and the electrode pad 76 are electrically connected through the connecting portion 78. The electrode pad 77 is provided on the other side of the mounting portion 72 in the Y-axis direction when seen in the Z-axis direction. The electrode pad 76 and the electrode pad 77 are aligned with each other in the X-axis direction.

The electrode pad 76 and the electrode pad 77 are disposed outside the Fabry-Perot interference filter 10 when seen in the Z-axis direction. The electrode pad 76 and the electrode pad 77 are disposed outside the space A. The electrode pad 76 and the electrode pad 77 are disposed on a side opposite to the Fabry-Perot interference filter 10 with respect to the side surface 91f of the first support part 91 and the side surface 92f of the second support part 92 when seen in the Z-axis direction.

The light detector 61 is mounted on the mounting portion 71. One electrode (one of a positive electrode and a negative electrode) of the light detector 61 is electrically connected to the mounting portion 71. As a result, one electrode of the light detector 61 is electrically connected to the electrode pad 73 on the mounting surface 7a of the wiring board 7. The light detector 61 faces the first mirror part 35 and the second mirror part 36 of the Fabry-Perot interference filter 10 on one side (a side of the space A) of the first support part 91 in the X-axis direction and on the other side (a side of the space A) of the second support part 92 in the X-axis direction. The light detector 61, the first support part 91, and the second support part 92 are aligned with each other in the X-axis direction. The light detector 61 completely overlaps the Fabry-Perot interference filter 10 when seen in the Z-axis direction. The light detector 61 completely overlaps the first support part 91 and the second support part 92 when seen in the X-axis direction. The light detector 61 is disposed inside the space A.

A distance D1 between the light detector 61 and the first support part 91 in the X-axis direction and a distance D2 between the light detector 61 and the second support part 92 in the X-axis direction are equal to each other. That is, the light detector 61 is disposed on the mounting surface 7a such that the distance D1 and the distance D2 are equal to each other. The distance between the light detector 61 and the first support part 91 in the X-axis direction is the shortest distance between the light detector 61 and the first support part 91 in the X-axis direction. The distance D1 is a distance between the other end of the light detector 61 on a side closer to the first support part 91 and the inner side surface 91d of the first support part 91. Similarly, the distance between the light detector 61 and the second support part 92 in the X-axis direction is the shortest distance between the light detector 61 and the second support part 92 in the X-axis direction. The distance D2 is a distance between one end of the light detector 61 on a side closer to the second support part 92 and the inner side surface 92d of the second support part 92. The distance D1 is smaller than the first width W1. The distance D2 is smaller than the second width W2.

The temperature detector 62 is mounted on the mounting portion 72. One electrode (one of a positive electrode and a negative electrode) of the temperature detector 62 is electrically connected to the mounting portion 72. As a result, one electrode of the temperature detector 62 is electrically connected to the electrode pad 76 on the mounting surface 7a of the wiring board 7. The temperature detector 62 completely overlaps the Fabry-Perot interference filter 10 when seen in the Z-axis direction. The temperature detector 62 completely overlaps the first support part 91 and the second support part 92 when seen in the X-axis direction. The temperature detector 62 is disposed inside the space A.

A distance (a first distance) D3 between the temperature detector 62 and the first support part 91 in the X-axis direction and a distance (a second distance) D4 between the temperature detector 62 and the second support part 92 in the X-axis direction are equal to each other. That is, the temperature detector 62 is disposed on the mounting surface 7a such that the distance D3 and the distance D4 are equal to each other. The distance between the temperature detector 62 and the first support part 91 in the X-axis direction is the shortest distance between the temperature detector 62 and the first support part 91 in the X-axis direction. The distance D3 is a distance between the other end of the temperature detector 62 on a side closer to the first support part 91 and the inner side surface 91d of the first support part 91. Similarly, the distance between the temperature detector 62 and the second support part 92 in the X-axis direction is the shortest distance between the temperature detector 62 and the second support part 92 in the X-axis direction. The distance D4 is a distance between one end of the temperature detector 62 on a side closer to the second support part 92 and the inner side surface 92d of the second support part 92. The distance D3 is smaller than the first width W1. The distance D4 is smaller than the second width W2.

The light detection device 1A includes a plurality of lead pins 11 provided in the stem 3 and a plurality of wires 12, 81, 82, 83, 84, 85, and 86. Each lead pin 11 is disposed outside the wiring board 7 when seen in the Z-axis direction. Each lead pin 11 penetrates the stem 3 while electrical insulation and airtightness between the lead pin 11 and the stem 3 is maintained (see FIG. 1). An end portion of each lead pin 11 (an end portion of each lead pin 11 in the housing 2) is located on a side closer to the Fabry-Perot interference filter 10 with respect to the inner surface 3a of the stem 3 in the Z-axis direction. The end portion of each lead pin 11 is located on a side closer to the stem 3 with respect to the Fabry-Perot interference filter 10 in the Z-axis direction. Each lead pin 11 is fixed to the stem 3. Each of one terminal 25 and one terminal 26 of the Fabry-Perot interference filter 10 and the end portion of the corresponding lead pin 11 are electrically connected through the wire 12. Each of a pair of terminals 25 and a pair of terminals 26 of the Fabry-Perot interference filter 10 and the end portions of the corresponding lead pins 11 may be electrically connected through the wire 12. Further, in the present embodiment, as an example, the end portions of the two lead pins 11 connected to a ground potential are connected to the stem 3 through the wire 12. As a result, the stem 3 is connected to the ground potential. Further, the end portion of each lead pin 11 may be located on a surface including the inner surface 3a of the stem 3.

The electrode pad 73 and the end portion of the corresponding lead pin (a first terminal) 11 are electrically connected through the wire (a first wire) 81. That is, the wire 81 electrically connects one electrode of the light detector 61 and the end portion of the lead pin 11. The other electrode (the other of a positive electrode and a negative electrode) of the light detector 61 and the electrode pad 74 are electrically connected through the wire (a second wire) 82. The electrode pad 74 and the end portion of the corresponding lead pin (a second terminal) 11 are electrically connected through the wire (a third wire) 83. That is, the wire 82 and the wire 83 electrically connect the other electrode of the light detector 61 and the end portion of the lead pin 11. The wire 82 and the wire 83 may be separated from each other or may be overlap each other in the electrode pad 74. That is, the wire 82 and the wire 83 may be connected to the electrode pad 74 at different positions on the electrode pad 74 or may be connected to the electrode pad 74 at the same position on the electrode pad 74.

The electrode pad 76 and the end portion of the corresponding lead pin 11 are electrically connected through the wire 84. That is, the wire 84 electrically connects one electrode of the temperature detector 62 and the end portion of the lead pin 11. The other electrode (the other of a positive electrode and a negative electrode) of the temperature detector 62 and the electrode pad 77 are electrically connected through the wire 85. The electrode pad 77 and the end portion of the corresponding lead pin 11 are electrically connected through the wire 86. That is, the wire 85 and the wire 86 electrically connect the other electrode of the temperature detector 62 and the end portion of the lead pin 11. The wire 85 and the wire 86 may be separated from each other or may be overlap each other in the electrode pad 77. That is, the wire 85 and the wire 86 may be connected to the electrode pad 77 at different positions on the electrode pad 77 or may be connected to the electrode pad 77 at the same position on the electrode pad 77.

As described above, it is possible to input/output electric signals with respect to each of the Fabry-Perot interference filter 10, the light detector 61, and the temperature detector 62. The connection between each wire 12, 81, 82, 83, 84, 85, or 86 and each lead pin 11 or each electrode pad 73, 74, 76, or 77 is performed by, for example, wire bonding.

In the light detection device 1A configured as described above, when light is input to the bandpass filter 14 from the outside of the housing 2 via the opening 2a, the light transmission member 13, and the adhesive member 15, only light in a predetermined wavelength range is transmitted through the bandpass filter 14. The light transmitted through the bandpass filter 14 is input to the light transmission region 10a of the Fabry-Perot interference filter 10, and light having a wavelength corresponding to the distance between the first mirror part and the second mirror part 36 is transmitted through the light transmission region 10a. The light transmitted through the light transmission region 10a is input to the light receiving portion of the light detector 61 and is detected by the light detector 61. Therefore, it is possible to obtain an optical spectrum by detecting an intensity of the light transmitted through the light transmission region 10a with the light detector 61 while changing the distance between the first mirror part 35 and the second mirror part 36 in the Fabry-Perot interference filter 10.

In the light detection device 1A, the distance between the first mirror part 35 and the second mirror part 36 is controlled according to a potential difference between the first mirror part 35 and the second mirror part 36, and a wavelength of light transmitted through the first mirror part 35 and the second mirror part 36 is controlled according to the distance between the first mirror part 35 and the second mirror part 36. Further, in order to correct the temperature characteristics of the Fabry-Perot interference filter 10, a temperature of the space A in which the Fabry-Perot interference filter 10 is disposed is detected by the temperature detector 62.

[Operation and Effect]

In the light detection device 1A, the distance D3 between the temperature detector 62 and the first support part 91 in the X-axis direction is smaller than the first width W1 of the first support region 91g in the X-axis direction. As a result, it is possible to bring the temperature detector 62 closer to the first support part 91 while sufficiently securing an area of the first support region 91g which is a thermal connection region between the Fabry-Perot interference filter 10 and the first support part 91. Therefore, it is possible to obtain a temperature in which the temperature of the Fabry-Perot interference filter 10 is accurately reflected. Therefore, according to the light detection device 1A, it is possible to correct the temperature characteristics of the Fabry-Perot interference filter 10 with high accuracy.

Further, the light detection device 1A includes the second support part 92 disposed on the mounting surface 7a to face the first support part 91 with the light detector 61 interposed therebetween in the X-axis direction. The outer edge portion 10b of the Fabry-Perot interference filter 10 is disposed in the second support region 92g of the second support part 92.

The temperature detector 62 is disposed on the mounting surface 7a to overlap the second support part 92 when seen in the X-axis direction. The distance D4 between the temperature detector 62 and the second support part 92 in the X-axis direction is smaller than the second width W2 of the second support region 92g in the X-axis direction. According to this, it is possible to bring the temperature detector 62 closer to the second support part 92 while sufficiently securing an area of the second support region 92g which is a thermal connection region between the Fabry-Perot interference filter 10 and the second support part 92. Therefore, it is possible to obtain a temperature in which the temperature of the Fabry-Perot interference filter 10 is more accurately reflected.

Further, in the light detection device 1A, the outer edge portion 10b of the Fabry-Perot interference filter 10 is disposed in the first support region 91g and the second support region 92g such that the first width W1 and the second width W2 are equal to each other. The temperature detector 62 is disposed on the mounting surface 7a such that the distance D3 and the distance D4 are equal to each other. According to this, it is possible to obtain a temperature in which the temperature of the Fabry-Perot interference filter 10 is evenly reflected via each of the first support part 91 and the second support part 92.

Further, in the light detection device 1A, in the space A which is located between the wiring board 7 and the Fabry-Perot interference filter 10 in the Z-axis direction and is located between the first support part 91 and the second support part 92 in the X-axis direction, a value obtained by dividing a width of the space A in the Y-axis direction by a width of the space A in the X-axis direction is 1.5 or more. According to this, while the temperature detector 62 is brought closer to each of the first support part 91 and the second support part 92 in the X-axis direction, the length of the first support region 91g in the Y-axis direction and the length of the second support region 92g in the Y-axis direction can be secured, and thus the area of the first support region 91g and the area of the second support region 92g can be sufficiently secured. From a viewpoint of securing the length of the first support region 91g in the Y-axis direction and the length of the second support region 92g in the Y-axis direction while the temperature detector 62 is brought closer to each of the first support part 91 and the second support part 92, the aspect ratio of the space A is preferably 1.8 or more and more preferably 2 or more.

Further, in the light detection device 1A, the wiring board 7 has a long shape having the Y-axis direction as a longitudinal direction, and each of the first support part 91 and the second support part 92 is disposed on the mounting surface 7a to extend along each of both edge portions of the wiring board 7 in the X-axis direction. According to this, it is possible to easily form the space A in which the width in the Y-axis direction is larger than the width in the X-axis direction.

Further, the light detection device 1A includes the stem 3 on which the wiring board 7 is disposed, the plurality of lead pins 11 provided in the stem 3, the wire 81 that electrically connects one electrode of the light detector 61 and the end portion of the lead pin 11, and the wire 82 and the wire 83 that electrically connect the other electrode of the light detector 61 and the end portion of the lead pin 11. The wiring board 7 has the wiring 70 that has the electrode pad 73 electrically connected to the one electrode of the light detector 61 on the mounting surface 7a and provided on the mounting surface 7a, and the electrode pad 74 provided on the mounting surface 7a. The wire 81 electrically connects the electrode pad 73 and the end portion of the lead pin 11, the wire 82 electrically connects the other electrode of the light detector 61 and the electrode pad 74, and the wire 83 electrically connects the electrode pad 74 and the end portion of the lead pin 11. The electrode pad 73 and the electrode pad 74 are located outside the Fabry-Perot interference filter 10 when seen in the Z-axis direction. According to this, it is possible to prevent the wire 82 and the wire 83 from coming into contact with peripheral members (the Fabry-Perot interference filter 10, the first support part 91, the second support part 92, and the like).

Second Embodiment

Figure 6:
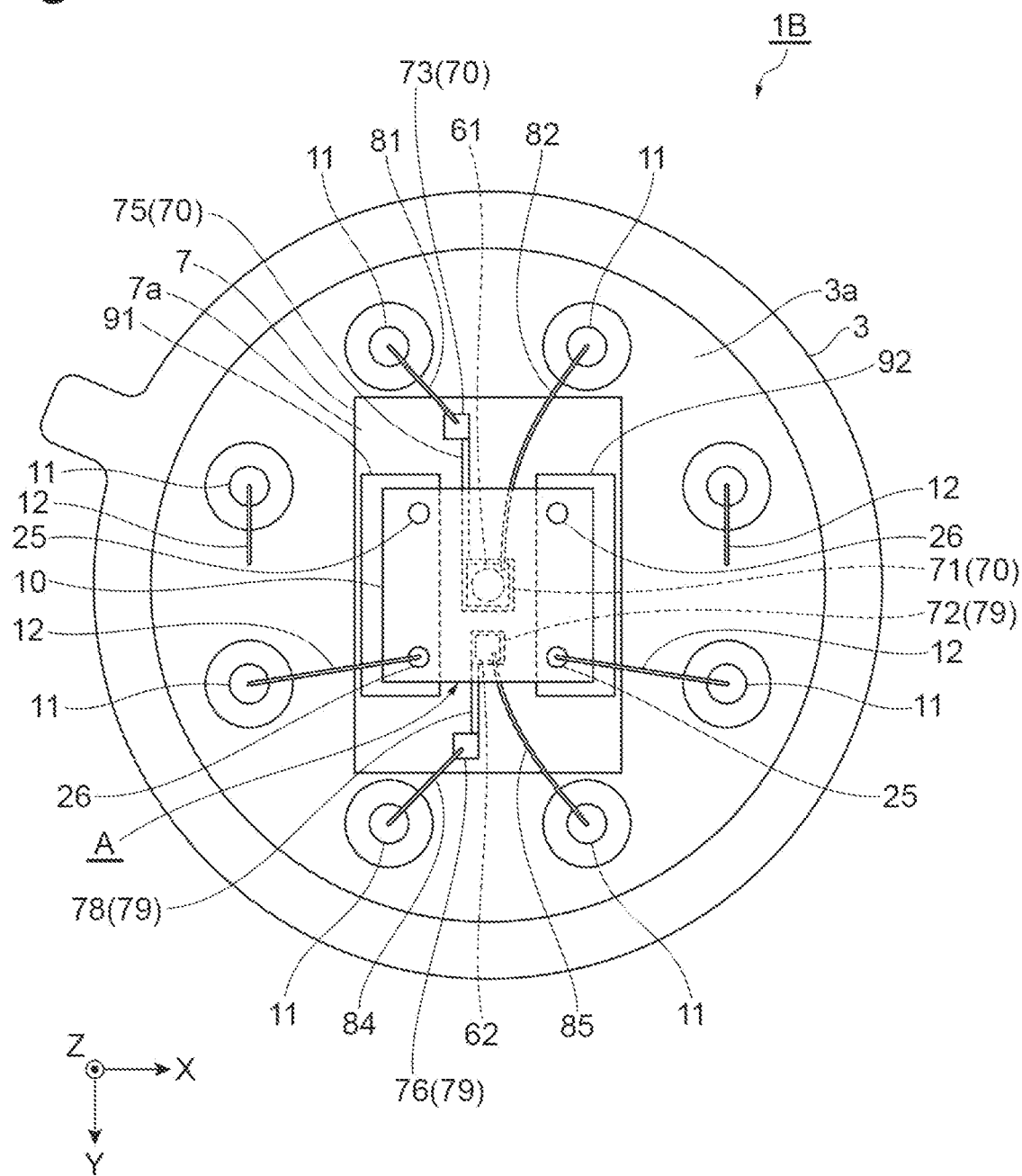
FIG. 6 is a plan view of an internal structure of a light detection device according to a second embodiment.
Figure 7:
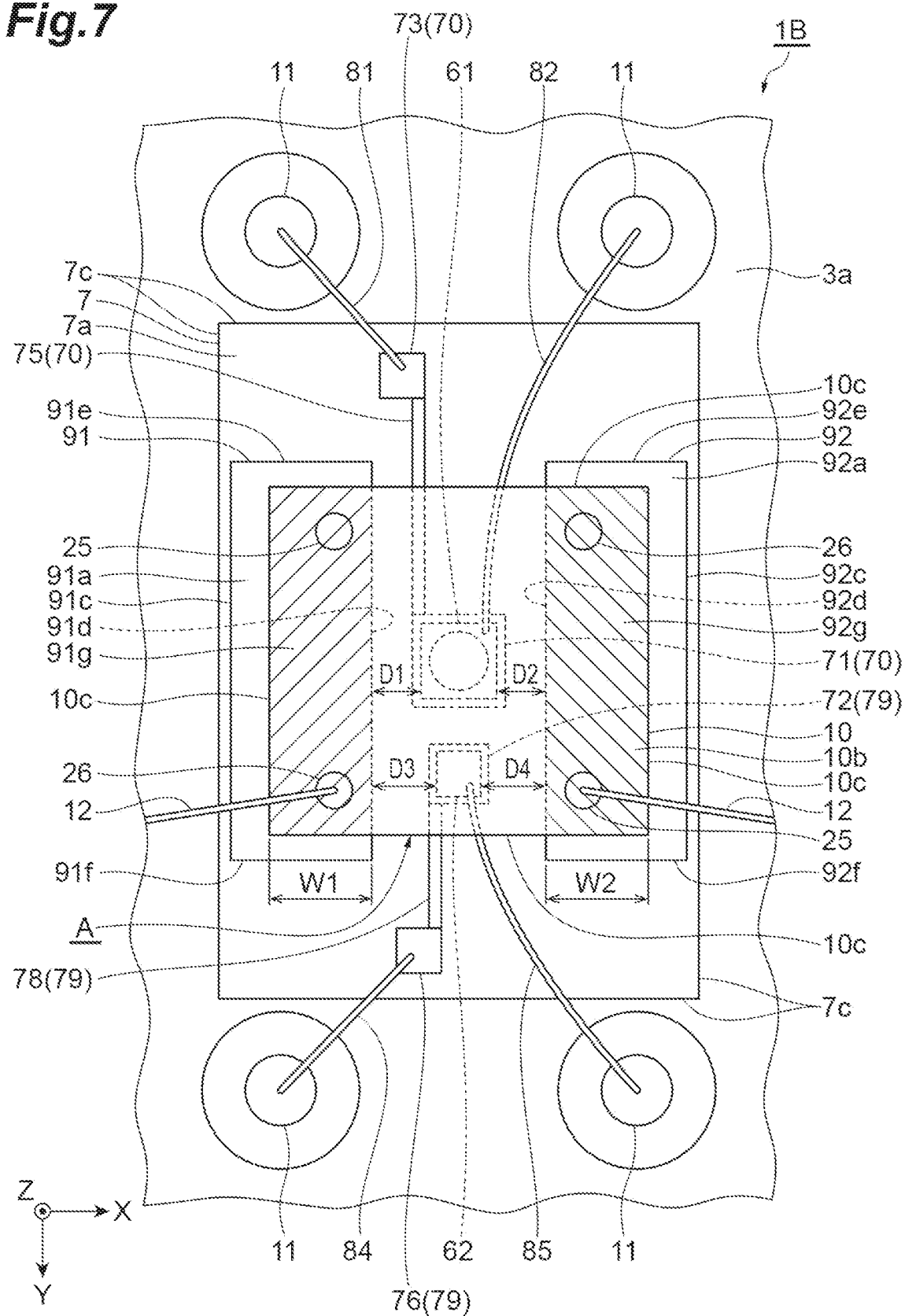
FIG. 7 is a plan view of a part of the internal structure of the light detection device shown in FIG. 6.

As shown in FIGS. 6 and 7, a light detection device 1B of a second embodiment is mainly different from the light detection device 1A of the first embodiment in that it does not include the electrode pad 74, the electrode pad 77, the wire 83, and the wire 86.

As described above, the light detection device 1B does not include the electrode pad 74, the electrode pad 77, the wire 83, and the wire 86. The other electrode of the light detector 61 is electrically connected directly to the end portion of the lead pin 11 through the wire 82. The other electrode of the temperature detector 62 is electrically connected directly to the end portion of the lead pin 11 through the wire 85.

The wire 82 and the wire 85 are bent. Specifically, the wire 82 and the wire 85 are bent in a direction away from the peripheral members not to come into contact with the peripheral members. More specifically, the wire 82 and the wire 85 are bent in a direction away from the second support part 92 when seen in the Z-axis direction. The wire 82 and the wire 85 are bent to avoid the second support part 92 when seen in the Z-axis direction. As a result, it is possible to prevent the wire 82 and the wire 85 from coming into contact with the second support part 92. Further, the wire 82 and the wire 85 are bent in a direction away from the Fabry-Perot interference filter 10 in the vicinity of the side surface 10c of the Fabry-Perot interference filter 10 when seen in the X-axis direction. The wire 82 and the wire 85 are bent to avoid the Fabry-Perot interference filter 10 in the vicinity of the side surface 10c of the Fabry-Perot interference filter 10 when seen in the X-axis direction. As a result, it is possible to prevent the wire 82 and the wire 85 from coming into contact with the Fabry-Perot interference filter 10. As described above, since the end portion of each lead pin 11 is located on a side closer to the stem 3 with respect to the Fabry-Perot interference filter 10 in the Z-axis direction, it is easy to bend the wire 82 and the wire 85 to avoid the Fabry-Perot interference filter 10.

As described above, according to the light detection device 1B of the second embodiment, it is possible to correct the temperature characteristics of the Fabry-Perot interference filter 10 with high accuracy as in the light detection device 1A of the first embodiment described above. Further, according to the light detection device 1B, it is possible to suppress the generation of a noise in the detection signal output from the light detector 61 due to a voltage signal applied to the Fabry-Perot interference filter 10.

Figure 8:
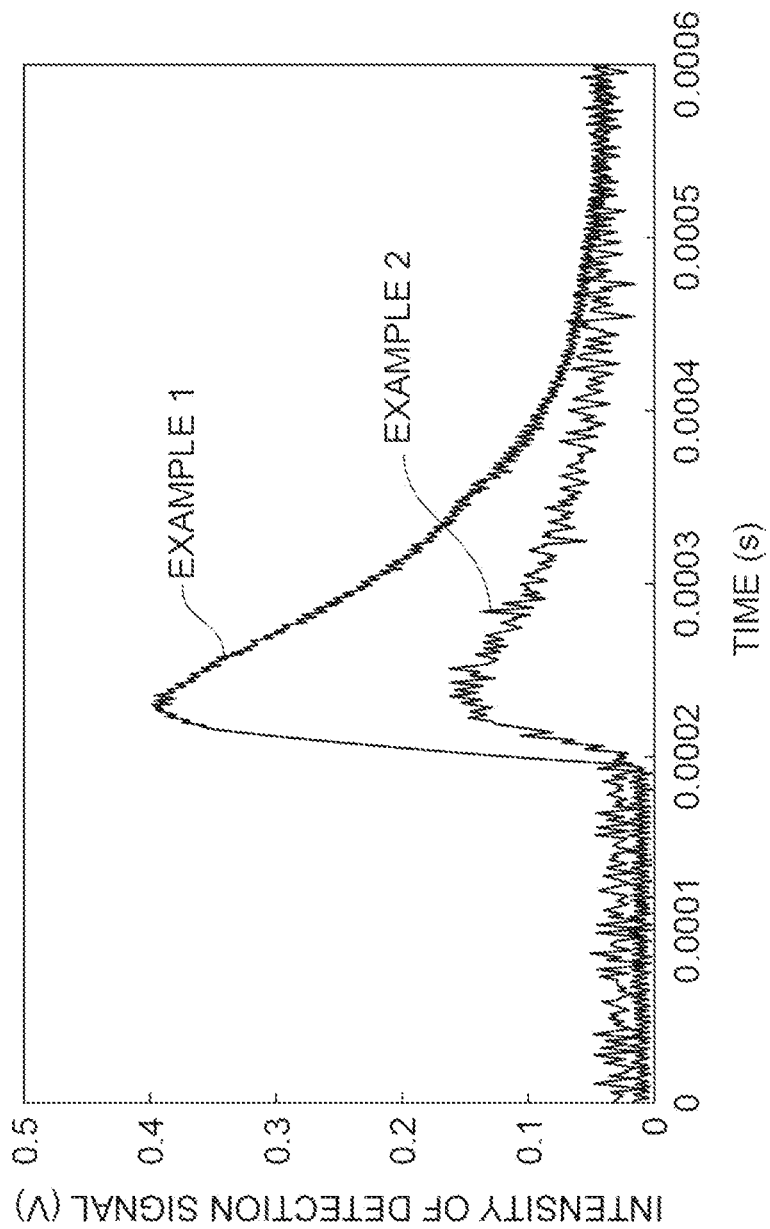
FIG. 8 is a graph showing a time change of a detection signal output from a light detector.

Hereinafter, the noise suppression effect will be described on the basis of the results of an experiment (Example 1) performed using the light detection device 1A and the results of an experiment (Example 2) performed using the light detection device 1B. FIG. 8 is a graph showing a time-based change of the detection signal output from the light detector 61 in a case in which a voltage is applied between the terminal 25 and the terminal 26 of the Fabry-Perot interference filter 10 in each of Example 1 and Example 2.

In a case in which a voltage is applied between the terminal 25 and the terminal 26 of the Fabry-Perot interference filter 10, in a period until the distance between the first mirror part 35 and the second mirror part 36 reaches the distance corresponding to the light of the target wavelength, the detection signal from the light detector 61 is maintained at about zero. However, as shown in FIG. 8, in a part of the above period (for example, 0 to 0.0006 s), a noise (a crosstalk signal) that suddenly rises in the detection signal output from the light detector 61 may occur. It is considered that this is due to the voltage signal applied to the Fabry-Perot interference filter 10. From the results shown in FIG. 8, it can be seen that a noise is suppressed in Example 2 as compared with Example 1.

Modification Example

The present disclosure is not limited to the first embodiment and the second embodiment described above. For example, in the first embodiment and the second embodiment, an example in which the light detector 61 completely overlaps the Fabry-Perot interference filter 10 when seen in the Z-axis direction has been shown, but at least a part of the light detector 61 only has to overlap a part of the Fabry-Perot interference filter 10. A part of the light detector 61 may be located outside the Fabry-Perot interference filter 10 when seen in the Z-axis direction.

Further, in the first embodiment and the second embodiment, an example in which the light detector 61 completely overlaps the first support part 91 and the second support part 92 when seen in the X-axis direction has been shown, but at least a part of the light detector 61 may overlap the first support part 91 and the second support part 92 when seen in the X-axis direction. A part of the light detector 61 may be located outside the first support part 91 or the second support part 92 when seen in the X-axis direction. At least a part of the light detector 61 only has to overlap a part of the first support part 91 when seen in the X-axis direction.

Further, in the first embodiment and the second embodiment, an example in which the temperature detector 62 completely overlaps the Fabry-Perot interference filter 10 when seen in the Z-axis direction has been shown, but at least a part of the temperature detector 62 only has to overlap a part of the Fabry-Perot interference filter 10. A part of the temperature detector 62 may be located outside the Fabry-Perot interference filter 10 when seen in the Z-axis direction.

Further, in the first embodiment and the second embodiment, an example in which the temperature detector 62 completely overlaps the first support part 91 and the second support part 92 when seen in the X-axis direction has been shown, but at least a part of the temperature detector 62 may overlap the first support part 91 and the second support part 92 when seen in the X-axis direction. A part of the temperature detector 62 may be located outside the first support part 91 or the second support part 92 when seen in the X-axis direction. At least a part of the temperature detector 62 only has to overlap a part of the first support part 91 when seen in the X-axis direction.

Further, in the first embodiment and the second embodiment, an example in which the outer edge portion 10b of the Fabry-Perot interference filter 10 is disposed in the first support region 91g and the second support region 92g such that the first width W1 and the second width W2 are equal to each other has been shown, but the outer edge portion 10b of the Fabry-Perot interference filter 10 may be disposed in the first support region 91g and the second support region 92g such that the first width W1 and the second width W2 are different from each other. The first width W1 may be larger than the second width W2 or may be smaller than the second width W2.

Further, in the first embodiment and the second embodiment, an example in which the light detector 61 is disposed on the mounting surface 7a such that the distance D1 and the distance D2 are equal to each other has been shown, but the light detector 61 may be disposed on the mounting surface 7a such that the distance D1 and the distance D2 are different from each other. The distance D1 may be larger than the distance D2 or may be smaller than the distance D2.

Further, in the first embodiment and the second embodiment, an example in which the distance D1 is smaller than the first width W1 and the distance D2 is smaller than the second width W2 has been shown, but the distance D1 may be the first width W1 or more, and the distance D2 may be the second width W2 or more.

Further, in the first embodiment and the second embodiment, an example in which the temperature detector 62 is disposed on the mounting surface 7a such that the distance D3 and the distance D4 are equal to each other has been shown, but the temperature detector 62 may be disposed on the mounting surface 7a such that the distance D3 and the distance D4 are different from each other. The distance D3 may be larger than the distance D4 or may be smaller than the distance D4.

Further, in the first embodiment and the second embodiment, an example in which the distance D4 is smaller than the second width W2 has been shown, but the distance D4 may be the second width W2 or more. At least the distance D3 only has to be smaller than the first width W1.

Further, in the first embodiment and the second embodiment, an example in which the first support part 91 is disposed in a portion on the other side (a left side in the drawing) of the mounting surface 7a in the X-axis direction, and the second support part 92 is disposed on one side (a right side in the drawing) of the mounting surface 7a in the X-axis direction has been shown, but the first support part 91 may be disposed in a portion on one side (a right side in the drawing) of the mounting surface 7a in the X-axis direction, and the second support part 92 may be disposed in a portion on the other side (a left side in the drawing) of the mounting surface 7a in the X-axis direction. That is, in the first embodiment and the second embodiment, the first support part 91 and the second support part 92 may be rotated by 180° about the line L when seen in the Z-axis direction.

Further, in the first embodiment and the second embodiment, an example in which each of the first terminal and the second terminal are the lead pin 11 penetrating the stem 3 has been shown, but each of the first terminal and the second terminal may not be the lead pin. Each of the first terminal and the second terminal may be, for example, an electrode pad or the like provided on the mounting surface 7a of the wiring board 7. In this case, the light detection device 1A or the light detection device 1B may be configured as, for example, a surface mount device (SMD).

Further, in the first embodiment and the second embodiment, an example in which the first support part 91 and the second support part 92 are formed separately from the wiring board 7 has been shown, but the first support part 91 and the second support part 92 may be integrally formed with the wiring board 7. Further, the first support part 91 and the second support part 92 may be integrally formed with the substrate 21 of the Fabry-Perot interference filter 10.

The light detection device may include: a wiring board; a first support part and a second support part disposed on a mounting surface of the wiring board to face each other; a Fabry-Perot interference filter having a first mirror part and a second mirror part between which a distance is variable and having an outer edge portion disposed in a first support region of the first support part and a second support region of the second support part; a light detector disposed on the mounting surface to face the first mirror part and the second mirror part between the first support part and the second support part; and a temperature detector disposed on the mounting surface, wherein the temperature detector may be disposed on the mounting surface such that at least a part of the temperature detector overlaps a part of the Fabry-Perot interference filter when seen in a first direction perpendicular to the mounting surface and such that at least a part of the temperature detector overlaps a part of each of the first support part and the second support part when seen in a second direction in which the first support part and the second support part face each other, and wherein, in a space which is located between the wiring board and the Fabry-Perot interference filter in the first direction and is located between the first support part and the second support part in the second direction, a value obtained by dividing a width of the space in a third direction perpendicular to both the first direction and the second direction by a width of the space in the second direction may be 1.5 or more. In this light detection device, while the temperature detector is brought closer to each of the first support part and the second support part in the second direction, the length of the first support region in the third direction and the length of the second support region in the third direction can be secured, and thus the area of the first support region and the area of the second support region can be sufficiently secured. Therefore, it is possible to obtain a temperature in which the temperature of the Fabry-Perot interference filter is accurately reflected. Therefore, according to this light detection device, it is possible to correct the temperature characteristics of the Fabry-Perot interference filter with high accuracy.

REFERENCE SIGNS LIST 1A, 1B Light detection device
3 Stem (placement part)
7 Wiring board
7a Mounting surface
Fabry-Perot Interference Filter
10b Outer edge portion
61 Light detector
62 Temperature detector
11 Lead pin (first terminal, second terminal)
First mirror part
36 Second mirror part
73 Electrode pad (First electrode pad)
74 Electrode pad (Second electrode pad)
81 Wire (first wire)
82 Wire (second wire)
83 Wire (third wire)
91 First support part
91g First support region
92 Second support part
92g Second support region
A Space

The invention claimed is:
1. A light detection device comprising:
a wiring board including a first wiring;
a first support part disposed on a mounting surface of the wiring board;
a Fabry-Perot interference filter disposed on the first support part, and having a first mirror part and a second mirror part between which a distance is variable; and
a light detector disposed on the mounting surface to face the first mirror part and the second mirror part on one side of the first support part, wherein
the first wiring includes:
a first mounting portion provided on the mounting surface, and electrically connected to the light detector,
a first electrode pad provided on the mounting surface, and
a first connecting portion provided on the mounting surface, and connecting the first mounting portion and the first electrode pad, wherein
at least a portion of the first wiring on a side of the first electrode pad is disposed outside the Fabry-Perot interference filter when seen in a first direction perpendicular to the mounting surface.
2. The light detection device according to claim 1, wherein a distance between the first electrode pad and the light detector, in a third direction perpendicular to both the first direction and a second direction in which the first support part and the light detector are aligned with each other, is greater than a distance between the first support part and the light detector in the second direction.
3. The light detection device according to claim 1,
wherein the outer edge portion of the Fabry-Perot interference filter is disposed in a support region of the first support part, and
wherein the distance between the first support part and the light detector in a second direction, in which the first support part and the light detector are aligned with each other, is smaller than a width of the support region in the second direction.
4. The light detection device according to claim 1, further comprising:
a placement part on which the wiring board is disposed;
a first terminal provided in the placement part; and
a wire electrically connecting the first electrode pad and the first terminal.
5. The light detection device according to claim 1, further comprising:
a temperature detector disposed on the mounting surface, wherein
the temperature detector is disposed on the mounting surface such that at least a part of the temperature detector overlaps a part of the Fabry-Perot interference filter when seen in the first direction and such that at least a part of the temperature detector overlaps a part of the first support part when seen in the second direction in which the first support part and the light detector are aligned with each other, and
the wiring board further includes a second wiring, wherein
the second wiring includes:
a second mounting portion provided on the mounting surface, and electrically connected to the temperature detector,
a second electrode pad provided on the mounting surface, and
a second connecting portion provided on the mounting surface, and connecting the second mounting portion and the second electrode pad, wherein at least a portion of the second wiring on a side of the second electrode pad is disposed outside the Fabry-Perot interference filter when seen in the first direction.

6. The light detection device according to claim 1, further comprising:
a second support part disposed on the mounting surface to face the first support part with the light detector interposed therebetween in the second direction in which the first support part and the light detector are aligned with each other, wherein
the Fabry-Perot interference filter is disposed on the second support part, and
in a space which is located between the wiring board and the Fabry-Perot interference filter in the first direction and is located between the first support part and the second support part in the second direction, a value obtained by dividing a width of the space in the third direction perpendicular to both the first direction and the second direction by a width of the space in the second direction is 1.5 or more.

7. The light detection device according to claim 1, wherein the Fabry-Perot interference filter includes a second terminal, wherein the second terminal is located in a region of the first support part on a side of the light detector when seen in the first direction.

* * * * *